United States Patent [19]
Athey et al.

[11] 3,857,285
[45] Dec. 31, 1974

[54] ELECTRONIC THERMOMETER

[76] Inventors: Stuart E. Athey, 1914 Westwood; Robert R. C. Buchan, 404 S. Plum St.; Glenn M. Nally, 923 Maplecrest, all of Troy, Ohio 45373

[22] Filed: Sept. 14, 1972

[21] Appl. No.: 289,124

[52] U.S. Cl............ 73/362 AR, 338/196, 340/233
[51] Int. Cl. ............................................. G01k 7/24
[58] Field of Search ............... 73/362 AR; 340/233; 116/115, 133; 338/196

[56] References Cited
UNITED STATES PATENTS

| | | | |
|---|---|---|---|
| 2,206,715 | 7/1940 | Burat et al. | 73/362 AR |
| 3,139,753 | 7/1964 | Brudner | 73/362 AR |
| 3,348,415 | 10/1967 | Ash | 73/362 AR |
| 3,377,862 | 4/1968 | Gheorghia | 73/362 AR |
| 3,431,781 | 3/1969 | Wiggin | 73/362 AR |
| 3,469,449 | 9/1969 | Keller | 73/362 AR |
| 3,494,196 | 2/1970 | Moussette | 340/233 X |
| 3,570,313 | 3/1971 | Frank et al. | 73/362 AR |
| 3,593,581 | 7/1971 | Beightol | 73/362 AR |
| 3,695,112 | 10/1972 | Possell | 73/362 AR |

Primary Examiner—Donald O. Woodiel
Assistant Examiner—Frederick Shoon
Attorney, Agent, or Firm—Jacox & Meckstroth

[57] ABSTRACT

A housing adapted to be held in one hand, encloses a thumb-rotatable dial member which is mounted on the shaft of a potentiometer. The potentiometer is connected within a circuit which includes a temperature sensing thermistor probe, a light source, dual operational amplifiers, switching transistors and a series of resistors. The dial member has an outer cylindrical surface which carries a tape-like scale having a range of digital temperature readings which are progressively advanced past a window within the housing when the dial member is rotated. The housing also encloses a spring actuated reel which retracts a flexible conductor extending to the thermistor probe, and further encloses two batteries of different voltages. The higher voltage battery operates the control circuit, and the lower voltage battery operates the light source which is positioned in back of the scale and is energized when the window displays the temperature reading corresponding precisely to the temperature being sensed by the thermistor probe.

12 Claims, 7 Drawing Figures

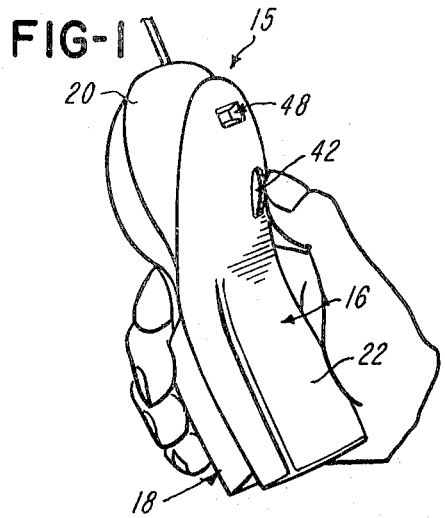
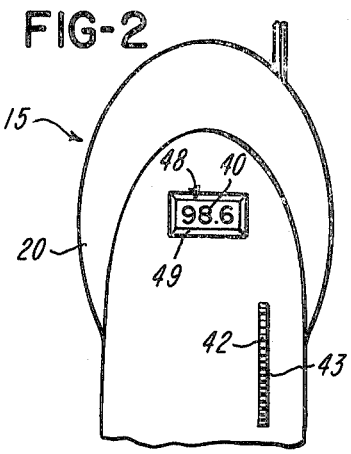
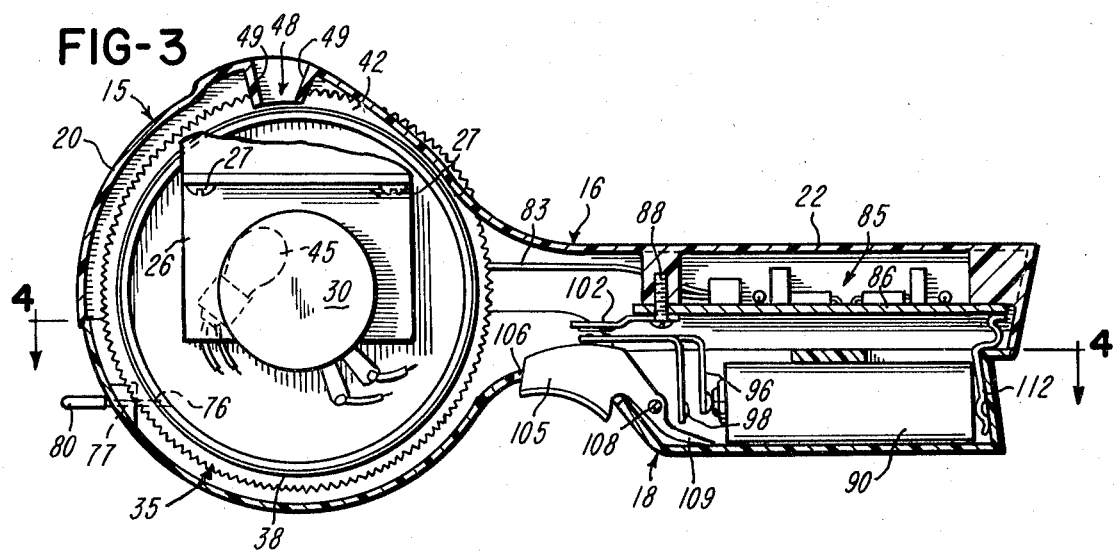
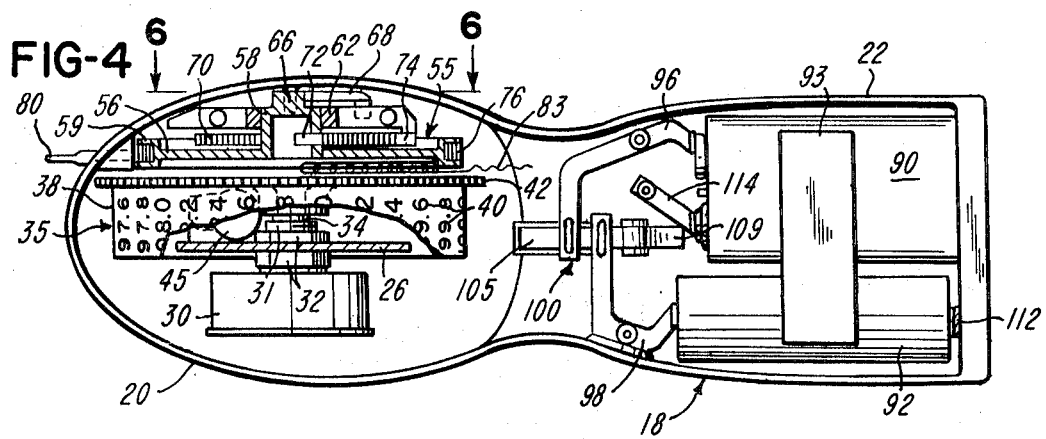

ELECTRONIC THERMOMETER

BACKGROUND OF THE INVENTION

In the art of electronic medical thermometers, it has been found desirable for the thermometer to be conveniently carried and operated by one hand so that the other hand is free to insert or position the temperature sensing probe in relation to the body of the person being examined. It is also desirable for the thermometer to provide precisely accurate temperature indications within a selected temperature range and be rugged and durable so that it can withstand sudden impacts without failing or affecting the accuracy of the temperature indication or readout. Furthermore, the basic accuracy of the unit should be established by the circuitry of components used, and calibration by the user should not be required. It has also been found desirable for the thermometer to provide for a digital readout or display so that it can be quickly and conveniently read without interpolation. In addition, an electronic circuit should provide for voltage and temperature stability when the thermometer is used in ambient environments of different temperature and should use the minimum number of low cost electronic components which are stable over a long operating life.

A number of electronic thermometers have been proposed or constructed such as, for example, the thermometers disclosed in U.S. Pat. Nos. 3,348,415, No. 3,431,781, No. 3,494,196, and No. 3,570,313. After carefully analyzing the electronic thermometers disclosed in these patents, it is apparent that each of the thermometers does not provide one or more of the above desirable features. For example, the thermometers shown in the first two patents each employ a sensitive meter for indicating the temperature being sensed, and the thermometers disclosed in the latter two patents each require costly electronic components if the circuits are to provide for voltage and temperature stability and are to compensate for the non-linearity of the thermistor temperature sensing probe so that the temperature readout or display is highly accurate.

SUMMARY OF THE INVENTION

The present invention is directed to an improved electronic thermometer which provides all of the desirable features mentioned above, and particularly, is convenient to use, inexpensive in construction, and provides for a reliable and accurate digital temperature display which can be quickly read without requiring any interpolation or calibration adjustment by the operator. The thermometer of the invention also incorporates rugged and durable electronic components which have voltage and temperature stability and a long operating life. In addition, the thermometer incorporates a spring actuated reel for retracting the conductor which extends to the temperature sensing probe, and uses a low cost power supply which provides for long term dependable service.

In accordance with the illustrated embodiment of the invention, an electronic thermometer incorporates a housing which includes a handle portion adapted to be held in one hand and a head portion which encloses a generally cylindrical dial mounted directly on the shaft of a variable resistor or potentiometer. A cord reel is also enclosed within the head portion of the housing adjacent the dial member and provides for retracting a flexible tape-like conductor which extends to a thermistor probe. Digital temperature readings or indications are provided on a flexible film tape which is wrapped around the dial member, and when the digital temperature reading corresponding to the temperature being sensed, is presented to a window formed within the housing, a light source is energized to illuminate and display the temperature reading.

The electronic circuit and a set of batteries are enclosed within the handle portion of the housing, and the circuit includes dual operational amplifiers which are connected with a series of control resistors and switching transistors for actuating the light source when the temperature reading being displayed corresponds precisely to the temperature being sensed by the thermistor probe.

Other features and advantages of the invention will be apparent from the following description, the accompanying drawings and the appended claims.

BRIEF DESCRIPTION OF THE DRAWINGS

FIG. 1 is a perspective view of an electronic medical thermometer constructed in accordance with the invention and illustrating its adaptation for one hand operation;

FIG. 2 is a top view of the front or head portion of the thermometer shown in FIG. 1 and illustrating a typical digital readout of a temperature;

FIG. 3 is a longitudinal vertical section of the thermometer shown in FIG. 1 and illustrating the arrangement of internal components;

FIG. 4 is a horizontal section taken generally on a line 4—4 of FIG. 3;

DESCRIPTION OF THE PREFERRED EMBODIMENTS

Figure 5:
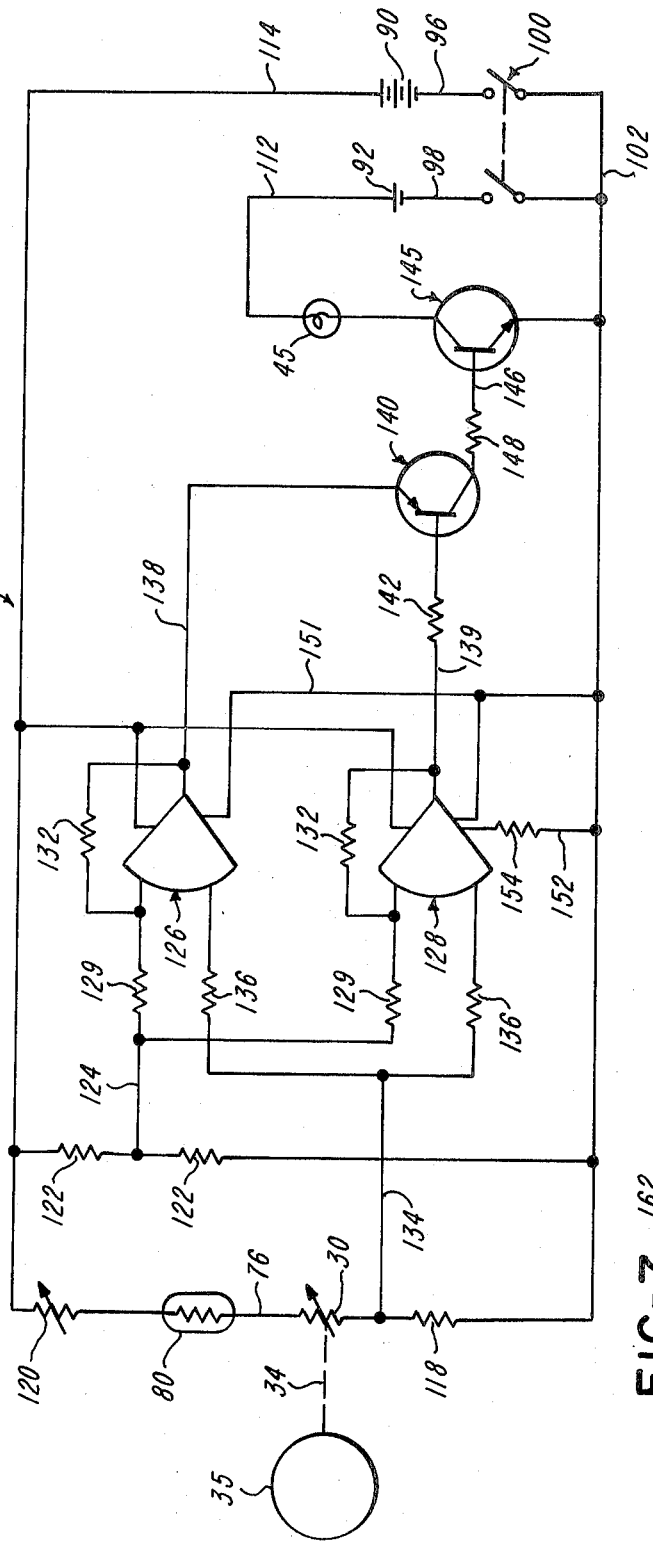
FIG. 5 is a schematic circuit diagram for the electronic thermometer shown in FIGS. 1-4.

Referring to FIGS. 1-4, an electronic thermometer includes a housing 15 consisting of an upper section 16 which mates with and receives a lower section 18. The housing sections are molded of a thermoplastics material and cooperate to form a front head portion 20 and a rear handle portion 22. The head portion 20 of the housing 15 is generally oval in horizontal cross-section (FIG. 4) and generally circular in vertical cross-section (FIG. 3), and the handle portion 22 is generally rectangular in both horizontal and vertical cross-sections.

An inverted L-shaped metal bracket 26 is supported within the head portion 20 of the housing 15 by a set of screws 27 which are threaded into downwardly projecting bosses (not shown) molded as an integral part of the upper section 16 of the housing 15. A variable resistor or potentiometer 30 includes a threaded bushing 31 which is secured to the bracket 26 by a set of nuts 32. The bushing 31 rotatably supports the shaft 34 of the potentiometer 30.

A generally cylindrical cup-shaped dial member 35 includes a hub which is rigidly secured to the shaft 34 of the potentiometer 30 and is constructed of a substantially transparent thermoplastics material. The dial member 35 has an outer cylindrical surface on which is mounted a flexible tape-like scale 38 formed of a tranparent film material. A series of numerical or digital temperature readings or numbers 40 are photographically formed on the scale 38 and provide a predetermined temperature range around the cylindrical outer surface of the dial member 35. The range illustrated is adapted for a medical thermometer and extends from 95° F. to 107° F. in increments of 0.2° F. Since the dial member 35 and the shaft 34 of the potentiometer 30 rotate through an angle of approximately 290°, the tape-like scale 38 is retained on the outer surface of the dial member 35 by a strip of adhesive tape which joins the opposing end portions of the scale 38 to the dial member 35. The scale 38 may also be attached by a suitable adhesive or other fastening means.

The dial member 35 also includes an outwardly projecting peripheral flange 42 which has a serrated outer edge surface. A portion of the flange 42 projects upwardly and outwardly through a slot 43 formed within the upper housing section 16 for engagement by the thumb of the hand supporting the housing 15, as illustrated in FIG. 1. A light source in the form of a 1.2 volt lamp 45 (FIGS. 3 and 4) is positioned within the hollow dial member 35. When the lamp 45 is energized, as will be explained later, it illuminates the scale 38 so that the number 40 at the top of the dial member 35 is clearly readable through a recessed window or opening 48 formed within the top of the head portion 20 of the housing 15 by a set of downwardly and inwardly converging walls 49.

Figure 6:
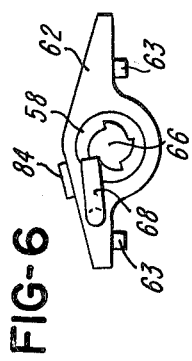
FIG. 6 is a section taken generally on the line 6—6 of FIG. 4.

A cord reel 55 (FIG. 4) is also enclosed within the head portion 20 of the housing 15 and includes a disc-like body 56 molded of a rigid plastics material. The body 56 includes a cylindrical hollow hub portion 58 and a peripherally extending channel portion 59. The hub portion 58 of the reel body 56 is rotatably supported by a molded plastic bearing block 62 (FIGS. 4 and 6) which is secured to the upper section 16 of the housing 15 by a set of mounting tabs 63. A ratchet gear or wheel 66 is molded as an integral part of the hub 58 and has a series of peripherally spaced stops or notches which are adapted to receive a lock pawl 68 pivotally supported by the bearing block 62. A clock type torsion spring 70 surrounds the hub portion 58 of the reel body 56 and includes an inner end portion 72 which extends through a radial slot formed within the hub portion 58. The outer end portion 74 of the torsion spring 70 is retained by a projecting tab formed as an integral part of the bearing block 62.

A flexible tape-like dual wire conductor 76 is wound within the outer peripheral channel portion 59 of the reel body 56 and has an outer end portion which extends through a slot 77 (FIGS. 3 and 4) formed within the lower section 18 of the housing 15 and which is connected to a non-linear temperature sensing thermistor probe 80. The thermistor probe 80 is selected to have a rated resistance value in the temperature range to be measured so that the current flowing through the probe will not cause significant self-heating of the probe. Specifically, the probe 80 is selected for a temperature range of 95° F. to 107° F., and has a resistance that varies with temperature at approximately 130 ohms per 0.1°F. It is also desirable for the thermistor probe 80 to have a minimum mass to provide a quick change in resistance with a corresponding change in the temperature being sensed.

The opposite or inner end portion of the conductor 76 projects through a radial slot formed within the channel portion 59 of the cord reel body 56 and extends as a twisted pair of wire leads 83 to an electronic operating circuit 85. When the conductor 76 is retracted, the leads 83 are twisted several turns in one direction. When the conductor 76 is pulled from the housing 15, the leads 83 twist several turns in the opposite direction. The space between the body 56 and the dial member 35 enables the leads 83 to twist. The pawl 68 prevents the reel body 56 from rotating and the conductor 76 from being retracted by the spring 70 when the housing 15 is in an upright position as shown in FIG. 3. To retract the conductor 76 and the probe 80, the housing 15 is inverted, and the conductor is tensioned so that the pawl 68 drops to a stop 84 (FIG. 6) and releases the reel body 56, for rotation by the spring 70.

The operating circuit 85 is mounted on a circuit board 86 which is positioned within the handle portion 22 of the housing 15 and is secured to the upper housing section 16 by a set of screws 88. Also located within the handle portion 22 of the housing 15 below the circuit board 86, is a 9 volt transistor battery 90 and a 1.5 volt penlight battery 92 which are retained by a panel 93. The inner negative terminals of the batteries 90 and 92 are connected by corresponding conductors 96 and 98 (FIG. 4) which form movable contacts of a double pole, single throw control switch 100. The switch 100 also includes a stationary contact 102 (FIG. 3) which projects downwardly from the circuit board 86 in overlying crossing relation to the movable contacts of the switch 100.

A molded plastic switch actuator or trigger 105 projects through a longitudinally extending slot 106 formed within the lower section 18 of the housing 15 and pivotally supported by a cross pin 108 (FIG. 3) secured to the lower housing section 18. Switch trigger 105 includes an integral spring finger portion 109 which projects rearwardly to engage the lower housing section 18 and bias the switch trigger 105 to a downwardly or outwardly projecting position as shown in FIG. 3. When the switch trigger 105 is depressed inwardly, the movable switch contacts formed by the conductors 96 and 98, contact the stationary contact 102 to energize the circuit 85 as will be explained later. The positive or rearward end terminal of the battery 92 is connected by a conductor 112 to the printed circuit board 86, and the positive forward contact of the battery 90 is connected by a conductor 114 (FIG. 4) to the circuit board 86.

Referring to the circuit diagram shown in FIG. 5, the potentiometer 30 and the thermistor probe 80 are connected in series with a precision resistor 118 and a variable trim resistor 120 across the battery 90 when the actuating switch 100 is closed. A set of precision reference resistors 122 are also connected across the battery 90, and a conductor 124 extends from between the series connected reference resistors 122 to the corresponding inverting input terminals of a set of high performance operational amplifiers 126 and 128. An input resistor 129 is provided in the line 124 for each of the operational amplifiers 126 and 128, and a feedback resistor 132 is connected across each of the amplifiers 126 and 128.

A conductor 134 extends from between the potentiometer 30 and the resistor 118 to the non-inverting input terminals of each of the amplifiers 126 and 128, and an input isolation resistor 136 is provided in the conductor 134 for each of the amplifiers. The amplifiers 126 and 128 are preferably formed as one integrated circuit, and one such circuit which has provided satisfactory results in a dual, frequency compensated, operational amplifier marketed by Fairchild Semiconductor under the identification number of μA 747 C.

The outputs of the operational amplifiers 126 and 128 are connected by conductors 138 and 139, respectively, to a PNP switching transistor 140, and a load resistor 142 is provided in the line 139 to determine the base drive of the transistor 140. The transistor 140 is connected to an NPN switching transistor 145 by a conductor 146 having a resistor 148 which determines the base drive of the transistor 145. As is apparent from FIG. 5, the transistor 145 is connected within the circuit which includes the lamp 45, the low voltage battery 92 and one side of the trigger actuated switch 100.

The operational amplifiers 126 and 128 have a minimum open loop voltage gain of 50,000 and are operated with a minimum closed loop voltage gain of 1,000 which is established by the resistors 129 and 132 in cooperation with the reference resistors 122. The change of the resistance of thermistor probe 80 is measured to an accuracy of 1 part in 400, and the indicating lamp 45 goes from off to full "on" for a resistance change of 1 part in 1,000. This results by selecting the ratios of the resistors 122, 129, and 132 to yield a closed loop gain which is always greater than 1,000. As long as this condition is maintained, the open loop gain variation of the amplifiers will not affect the desired accuracy of the indicated temperature.

The value of the resistors 122 is selected to be in the 1,000 ohm range so that the current drain from the battery 90 is minimized, and the value of the resistors 132 is kept within a practical megohm limit to achieve the gain requirements. Thus the resistors 122 establish a reference voltage for the operational amplifiers 126 and 128 at approximately one-half of the supply voltage of the battery 90, or about 4.5 volts. As mentioned above, the thermistor probe 80 is selected to have a resistance value in the temperature range to be measured, (95° F. to 107° F. for a medical thermometer) such that the current flowing through the probe 80 due to the voltage of the battery 90 will not cause significant self-heating errors. The resistance of thermistor probe 80 decreases with increasing temperature.

The trimming resistor 120 is provided to compensate for unit-to-unit variations which occur in commercially available thermistors. For example, by properly selecting the resistor 120, an accuracy of plus or minus 0.2° F. over the temperature range of 95° F. to 107° F. can be maintained with a thermistor probe which is specified to have a nominal value of plus or minus 5 percent. The variable resistor or potentiometer 30 is also specified to have no more than plus or minus 2 percent unit-to-unit variation in total resistance in order to maintain accuracy. This accuracy is also provided by mounting the dial member 35 directly on the shaft of the potentiometer 30 so that there is no relative motion or play between rotation of the dial member 35 and rotation of the shaft of the potentiometer.

The value of the resistor 118 is selected so that its resistance is equal to the total of the resistances of the trim resistor 120, the thermistor probe 80, and the potentiometer 30 when the resistor 120 is positioned at its nominal mid-range setting, the resistance of the thermistor probe 80 is at its nominal calibration temperature, and the resistance of the potentiometer 30 is set for indication of the nominal calibration temperature. Potentiometer 30 is connected so that its resistance increases with an indicated temperature increase.

As also shown in FIG. 5, a conductor 151 connects corresponding negative terminals of the operational amplifiers 126 and 128 to the common or negative side of the battery 90, and another conductor 152 having a resistor 154, also connects the offset input terminal of amplifier 128 to the negative side of the battery 90. The resistor 154 is selected to change the bias of the amplifier 128 slightly so that the change of the output of the amplifier 128 will occur at a slightly lower temperature indication than the change of the output of the amplifier 126. Thus the resistor 154 determines the temperature band during which the lamp 45 will remain energized. This band is set for 0.4° F. to provide a temperature readout accuracy of plus or minus 0.2° F.

In one electronic thermometer which operated very satisfactorily and provided an accuracy of plus or minus 0.2° F., the values of the various resistors shown in the diagram of FIG. 5 were as follows:

| Resistor | Resistance (ohms) | Resistor | Resistance |
|---|---|---|---|
| 30 | 0 – 15,000 | 132 | 4.7 megohms |
| 80 | 100,000 at 25° C. | 136 | 1,000 ohms |
| 118 | 66,000 | 142 | 1,000 ohms |
| 120 | 0 – 5,000 | 148 | 470 ohms |
| 122 | 1,500 | 154 | 1,200 ohms |
| 129 | 1,000 | | |

The electronic thermometer described above operates in the following manner. The thermistor probe conductor is pulled from the housing 15 and is retained in its extended position by the pawl 68 engaging one of the notches of the ratchet wheel 66. After the thermistor probe 80 is properly positioned, the actuating trigger 105 is depressed inwardly by the forefinger as illustrated in FIG. 1, thereby closing the contacts of the switch 100. For purpose of description, it is assumed that the temperature to be sensed by the probe 80 is 100° F.

The reference input to the operational amplifiers 126 and 128 through the line 124 is established by the resistors 122 at approximately one-half of the voltage of the battery 90 or approximately 4.5 volts. When the probe 80 is below 95° F., the voltage to the amplifiers 126 and 128 through the line 134 is less than the reference voltage through the line 124, and the outputs of the amplifiers 126 and 128 are in a low state so that no difference in potential exists across the base emitter junction of the transistor 140 and thus no current can flow through the transistor 140. Thus the transistor 145 remains off and the lamp 45 remains off.

As the temperature of the thermistor probe 80 increases to the temperature being sensed of 100° F., which happens within a few seconds, and the dial member 35 is set at the low end of the temperature range, for example, 95° F., the voltage to the amplifiers 126 and 128 through the line 134 will be greater than the reference voltage through the line 124 so that the outputs of the amplifiers are both in a high state. However, since there is no difference of potential between the outputs of the amplifiers 126 and 128, there is no potential across the transistor 140 and there is no flow of current to the transistor 145.

As the dial member 35 is rotated or advanced towards an indicated temperature of 100° F., and a temperature indication of 99.8° F. is reached, the output of the amplifier 128 shifts to a low state as a result of the resistor 154. This creates a voltage difference between the outputs of the amplifiers 126 and 128 so that the transistor 140 is driven on, thereby driving or turning on the transistor 145. This energizes the lamp 45 so that the indicated temperature of 99.8° F. is illuminated within the window 48.

As the dial member 35 is rotated or advanced further, the lamp 45 will remain energized until the indicated temperature through the window 48 is 100.2° F. At this point, the potentiometer 30 will be at a value which causes the output of the amplifier 126 to return to a low state so that the transistors 140 and 145 turn off and the lamp 45 is de-energized. If the dial member 35 is now rotated in the opposite direction, as soon as the temperature indication is slightly less than 100.2° F., for example, 100.16° F., the output of the amplifier 126 will move again to a high state, and the lamp 45 will again be energized. if the rotation of the dial member 35 is continued in the opposite direction, when the indicated temperature is slightly less than 99.8° F., for example, 99.76° F., the output of the amplifier 128 will move again to a high state, thereby de-energizing the lamp 85. Thus, the temperature indicated in the opening of window 48 by energizing of the lamp 85 is within 0.2° F. of the temperature being sensed by the thermistor probe 80.

Figure 7:
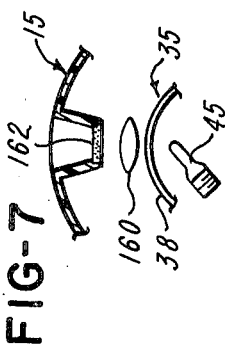
FIG. 7 is a somewhat diagrammatic fragmentary section illustrating a modification of the electronic thermometer shown in FIGS. 1-4.

Referring to FIG. 7 which shows a modification of the thermometer, the head portion 20 of the housing 15 may be made somewhat smaller by reducing the diameter of the dial member 35 and providing smaller numbers 40 around the outer cylindrical surface of the dial member. These smaller numbers are then enlarged and projected by a lens 160 onto a rear projecting screen 162 positioned within the display opening or window 48 of the housing 15. The enlarged projected numbers 40 are of substantially the same size as the numbers shown in FIGS. 2 and 4 and are easily readable when the lamp is energized.

From the drawings of the above description, it is apparent that an electronic thermometer constructed in accordance with the present invention, provides a number of desirable features and advantages. For example, one important advantage is provided by the circuit shown in FIG. 5, including the dual operational amplifiers 126 and 128 and the associated resistors. This circuit provides for using low cost standard components such as a linearly variable resistor of potentiometer 30 in combination with the non-linear thermistor probe 80. The non-linearity of the probe 80 is compensated for by a corresponding non-uniform spacing or distribution of the numbers 40 on the transparent tape-like scale 38 which is attached to the outer cylindrical surface of the dial member 35. This non-uniform distribution of the numbers 40 can be easily accomplished when the numbers 40 are photographically formed on the transparent film.

It is also apparent that the operation of the operational amplifiers 126 and 128 is dependent only upon the ratios of the resistances of the associated resistors. That is, the ratio of the resistors 122 establishes the reference voltage, and the ratio of the resistor 118 to the sum of the resistances of the resistor 120, the thermistor probe 80 and the potentiometer 30, establishes the desired output change point of the amplifiers 126 and 128. Additionally, the circuit arrangement of these components presents the same input conditions to the operational amplifiers over the full temperature sensing range in order to minimize errors. The value of the resistor 154 establishes the temperature band during which the lamp 45 is energized, and the ratio of the resistors 132 to the resistors 129 establishes the gain of the system.

While the lamp 45 could be operated from the battery 90, the separate battery 92 for powering the lamp 45 provides for lower cost in addition to a higher current which provides for greater brightness so that the indicated temperature is readily visible in a well lighted room. In addition, the higher voltage battery 90 has a useful life to a point where its voltage drops to approximately 6.5 volts before the amplifiers 126 and 128 becomes inoperative.

Other important features are provided by the fact that no calibration adjustment is required by the operator, and the fact that the digital display requires no interpolation by the operator. Furthermore, the circuit design provides for voltage and temperature stability and uses low cost components which can be efficiently assembled for minimizing the cost of the thermometer. In addition, the components provide for substantial durability and are arranged for convenient one hand operation. It is to be understood that as advances in the state of the art are made, the entire circuitry could be produced as a single integrated circuit to further reduce the cost.

While the forms of electronic thermometers herein described constitute preferred embodiments of the invention, it is to be understood that the invention is not limited to these precise forms of thermometers, and that changes may be made therein without departing from the scope and spirit of the invention as defined in the appended claims.

The invention having been described, the following is claimed:

1. An electronic thermometer comprising a housing, a variable resistor disposed within said housing, means for varying the resistance of said resistor, a temperature sensing probe adapted to change resistance in response to changes in temperature a digital temperature indicating scale calibrated according to a range of temperatures adapted to be sensed by said probe, said scale being movable in response to varying said resistor, a light source within said housing and positioned to illuminate at least a portion of said scale, an electrical power supply within said housing, a plurality of operational amplifiers within said housing, circuit means connecting said operational amplifiers, said variable resistor, said light source and said probe to said power supply, said circuit means being effective to actuate said light source when said scale indicates the temperature being sensed by said probe in response to varying said resistor, a cord reel supported for rotation within said housing, said circuit means includes an elongated flexible conductor wound on said reel and connected to said temperature sensing probe, a portion of said conductor being arranged to twist relative to the axis of said reel in response to extension and retraction of said conductor and probe, and spring means for urging said reel in a direction to retract said conductor.

2. An electronic thermometer comprising a housing, a variable resistor disposed within said housing, means for varying the resistance of said resistor, a temperature sensing probe adapted to change resistance in response to changes in temperature, a digital temperature indicating scale calibrated according to a range of temperatures adapted to be sensed by said probe, means for indicating a temperature on said scale, an electrical power supply within said housing, circuit means connecting said variable resistor and said probe to said power supply, said circuit means including a plurality of operational amplifiers, an input resistor and a feedback resistor connected to said operational amplifiers, reference resistor means connected to said input resistors, said circuit means being effective to actuate said indicating means for indicating on said scale the temperature being sensed by said probe in response to varying said resistor, said sensing probe comprises a thermistor connected in series with said variable resistor and a variable trim resistor, and a precision resistor connected to control the level at which said operational amplifiers operate with respect to the reference established by said reference resistor means.

3. An electronic thermometer as defined in claim 2 wherein said means for indicating a temperature on said scale include means defining an opening within said housing, a rear projection screen within said opening, and means for projecting and enlarging the temperature numbers from said scale to said screen.

4. An electronic thermometer comprising a housing, a variable resistor disposed within said housing, means for varying the resistance of said resistor, a temperature sensing probe adapted to change resistance in response to changes in temperature for producing a temperature input signal, digital temperature indicating means, an electrical power supply within said housing, circuit means connecting said variable resistor and said probe to said power supply, said circuit means including a plurality of operational amplifiers, an input resistor and a feedback resistor connected to each of said operational amplifiers for establishing a stable closed-loop voltage gain, reference resistor means connected to said input resistors for establishing a reference signal, said operational amplifiers connected to sense simultaneously said input signal with respect to said reference signal, a precision resistor connected to control the level at which said operational amplifiers operate with respect to said reference signal, and said circuit means being effective to actuate said temperature indicating means according to the temperature being sensed by said probe in response to varying said variable resistor.

5. An electronic thermometer as defined in claim 4 wherein said power supply comprises a first battery having a predetermined voltage rating for operating said circuit means, and a second battery having a lower voltage rating than said first battery and connected for operating said light source.

6. An electronic thermometer as defined in claim 4 wherein said closed loop voltage gain is at least 1,000.

7. An electronic thermometer as defined in claim 4 wherein said housing includes a head portion and a handle portion, said handle portion being adapted to be held in one hand, said means for varying said resistor including a dial member positioned to be rotated by the thumb of the hand holding said handle portion, and said circuit means include a normally open switch positioned to be actuated by a finger of the hand holding said handle portion.

8. An electronic thermometer as defined in claim 4 including resistor means connected to one of said operational amplifiers and being effective to set the input reference of said one operational amplifier slightly different than the input reference of the other said operational amplifier.

9. An electronic thermometer as defined in claim 4 wherein the outputs of said operational amplifiers are connected to a first switching transistor for actuation of said first switching transistor in response to a difference between said output of said operational amplifiers, a second switching transistor connected to control said temperature indicating means, and said second transistor being controlled by the operation of said first transistor.

10. An electronic thermometer as defined in claim 4 wherein said circuit means include a variable trim resistor connected to calibrate the circuit to said temperature sensing probe, said variable trim resistor is connected in series with said temperature sensing probe and said variable resistor, said circuit means being effective to present substantially the same input conditions to each of said operational amplifiers when the resistance sum of said trim resistor, said sensing probe and said variable resistor equals a predetermined fixed resistance.

11. An electronic thermometer comprising a housing, a variable resistor disposed within said housing, means for varying the resistance of said resistor and including a dial member having a substantially cylindrical outer surface, a temperature sensing probe adapted to change resistance in response to changes in temperature, an elongated flexible tape-like scale member extending around said outer surface of said dial member, a series of longitudinally spaced multiple digit numbers on said scale member and being calibrated according to a range to temperatures adapted to be sensed by said probe, a light source within said housing and positioned to illuminate at least a portion of said scale member, an electrical power supply within said housing, circuit means connecting said variable resistor and said probe to said power supply, said circuit means including a plurality of operational amplifiers, an input resistor and a feed back resistor connected to each of said operational amplifiers for establishing a stable closed-loop voltage gain, reference resistor means connected to said input resistors for establishing a reference signal, said operational amplifiers connected to sense simultaneously said input signal with respect to said reference signal, and said circuit means being effective to actuate said light source when said scale member indicates the temperature being sensed by said probe in response to varying said variable resistor.

12. An electronic thermometer as defined in claim 11 wherein said dial member includes a light transmittable hollow cylindrical portion having said outer surface, said scale member is light transmittable, and said light source is positioned to project light through said scale member and said cylindrical portion of said dial member to illuminate the indicated temperature.

* * * * *